United States Patent [19]

Wulfing

[11] Patent Number: 4,752,046
[45] Date of Patent: Jun. 21, 1988

[54] VIDEOCASSETTE TAPE SPOOL HAVING A WEAR BUTTON

[75] Inventor: James J. Wulfing, Afton, Minn.

[73] Assignee: Minnesota Mining and Manufacturing Company, St. Paul, Minn.

[21] Appl. No.: 872,543

[22] Filed: Jun. 10, 1986

[51] Int. Cl.⁴ .............................................. B65H 75/18
[52] U.S. Cl. .................................. 242/71.8; 242/199; 206/405; 206/406
[58] Field of Search ............... 206/303, 389, 403, 405, 206/406; 242/71.8, 71.9, 118.4, 199

[56] References Cited

U.S. PATENT DOCUMENTS 2,790,609  4/1957  Hawthorne et al. ................ 206/403
3,227,269  1/1966  Martinez et al. ................... 206/400
3,389,872  6/1968  Lymann ............................. 206/389

Primary Examiner—David T. Fidei
Attorney, Agent, or Firm—Donald M. Sell; James A. Smith; David W. Anderson

[57] ABSTRACT

A tape spool provides resistance to disassembly from shocks caused by rough handling by providing an annular hub projection extending axially of the spool hub to define a shoulder which interacts with an inner radial wall of a disk providing the second flange of the spool. The inner radial wall of the disk defines a central hole surrounding the hub projection, with contact between the radial wall of the disk and the shoulder of the hub restricting radial movement of the disk with respect to the hub. The disk and the hub also may include intermeshing splines which prevent relative rotation of the disk and the hub.

2 Claims, 1 Drawing Sheet

VIDEOCASSETTE TAPE SPOOL HAVING A WEAR BUTTON

BACKGROUND OF THE INVENTION

1. Field of the Invention

The invention concerns videocassette tape spools.

2. Description of the Prior Art

Each of the Betamax and VHS videocassettes has a pair of tape spools loosely positioned side-by-side within the cassette housing. When the cassette is inserted into a videotape recorder, a pair of spindles fit into interior teeth of the hubs of the spools and press the spools against a spring which is mounted in the cassette. The spring has two arms, each of which contacts a wear button on each of the tape spools.

It is desirable to provide for automatic assembly of the tape spools for economical manufacture and provisions for disassembly should be provided so that spools may be reused if the recording tape is damaged during assembly. A tape spool was described in Wulfing U.S. Pat. No. 4,520,969, and assigned to the assignee of the present invention, which included a single piece providing the spool hub and one flange, a disk providing the second flange and a separate piece which simultaneously provided the wear button and the means for retaining the second flange in assembled contact with the hub. The spool of U.S. Pat. No. 4,520,969 unfortunately had a propensity for spontaneous disassembly when subjected to rough handling, particularly when subjected to shocks which tended to force the second flange in a radial direction with respect to the hub.

SUMMARY OF THE INVENTION

The tape spool of the present invention provides increased resistance to flange separation while retaining the benefits of the prior tape spool discussed above. Like the tape spool of U.S. Pat. No. 4,520,969, the present invention includes a single piece which provides the tape spool hub and one of the flanges, a separate disk-shaped piece which defines the remaining flange and completes the hub to provide the tape spool, and a separate wear-button piece which connects to the hub and retains the disk in its assembled relationship to the hub. The present tape spool differs from the prior spool in that the present spool includes an annular hub projection extending axially of the hub adjacent the separate wear-button piece to define a shoulder terminating closely adjacent the wear-button piece and an inner radial wall in the disk which defines a central hole surrounding the hub projection, the hub projection and the inner radial wall of said disk interacting to restrict radial movement of the disk with respect to the hub.

The tape spool of the present invention may also include intermeshing splines oriented parallel to the axis of the hub which prevent relative rotation of the disk and the hub.

BRIEF DESCRIPTION OF THE DRAWING

The present invention will be more thoroughly described with reference to the accompanying drawing, wherein like numbers refer to like parts in the several views, and wherein.

DESCRIPTION OF THE PREFERRED EMBODIMENT

Figure 1:
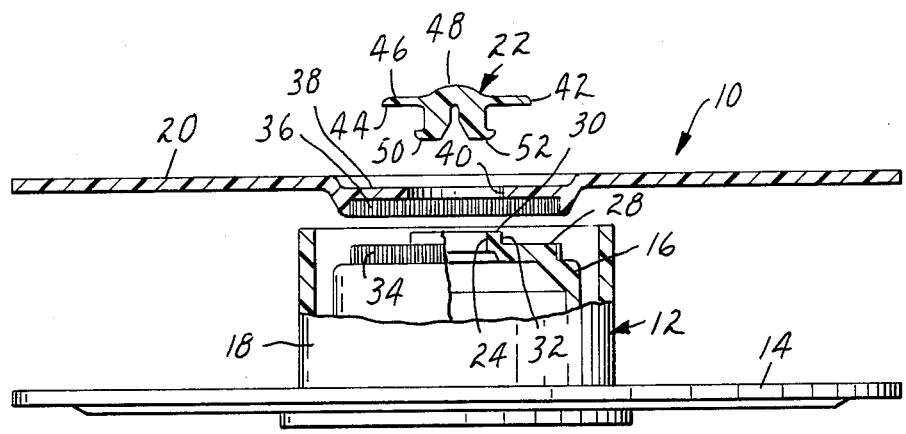
FIG. 1 is an axial cross-sectional view of disassembled tape spool of the present invention.
Figure 2:
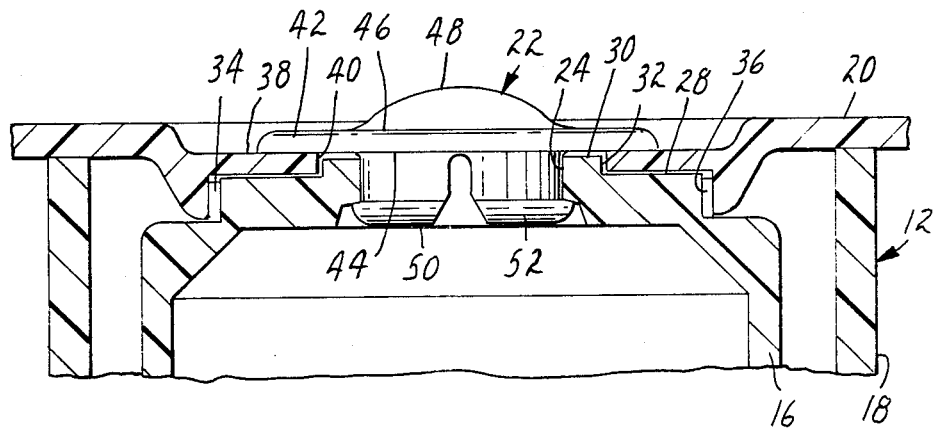
FIG. 2 is an axial, partial cross-sectional view of the tape spool of FIG. 1 as assembled.

The tape spool of the present invention, generally indicated as 10 in FIGS. 1 and 2, consists of three molded plastic pieces: (1) an opaque single piece 12 providing one flange 14 and a hub 16, the exterior surface of which is a cylindrical tape-winding surface 18; (2) a transparent disk 20 which defines a second flange which completes the tape spool 10 when connected to the hub 16; and (3) a wear-button piece 22 which snaps into the hub 16 and retains the disk 20 in proper assembled relationship to the hub 16. The single molded hub and flange unit 12 includes a radial wall 24 which defines a circular central opening which is concentric with the tape winding surface 18. Also included is a flat upper surface 28 which abuts the disk 20 and a projection 30 which extends axially from the hub 16 to define a shoulder 32 terminating closely adjacent the wear-button piece 22. The molded hub 16 further includes vertical splines 34 which are located below the upper surface 28 of the hub 16.

The disk 20 includes vertical splines 36 which mesh with the splines 34 of the hub 16 to prevent rotation of the disk 20 relative to the hub 16 and an interior web 38 which is flat to seat against the upper surface 28 of the hub 16. The disk web 38 is slightly thicker than the dimension of the shoulder 32 to ensure contact between the wear-button piece 22 and the disk 20. The web 38 includes an inner radial wall 40 which defines a central hole closely surrounding the annular hub projection 30 and which interacts with the hub projection 30 to prevent radial movement of the disk 20 relative to the hub 16.

The wear-button piece 22 includes a collar 42 having an inner face 44 and an outer face 46. The inner face 44 is flat and sized in diameter to contact the disk 20 and retain the disk 20 in contact with the hub 16 when the spool is assembled as shown in FIG. 2. The outer face 46 of the wear-button piece 22 bulges axially to form a central protuberance 48 which extends above the surface of the disk 20, when the spool is assembled, and which serves as the contact point between the spool 10 and the videocassette (not shown) into which the spool 10 is later assembled. The wear-button piece 22 further includes flexible detents 50 and 52 which are resiliently flexed inwardly upon insertion into the hub radial wall 24 and which expand radially after insertion to grip the hub radial wall 24 and retain the wear-button piece 22 and disk 20 in contact with the hub 16. It is understood that although two detents 50 and 52 are shown, the number of detents 50 and 52 could be increased or the gripping portion of the wear-button piece 22 could be a single circular piece, if sufficiently deformable and resilient.

To assemble the tape spool 10, the disk 20 is positioned with respect to the hub 16 so that the splines 34 and 36 intermesh and the web 38 is adjacent the upper surface 28 of the hub 16. The wear-button piece 22 is then forced through the hole in the hub 16 formed by the central wall 24 and, upon passage of the detents 50 and 52 through the wall 24, the detents 50 and 52 expand to grip the hub 16 and retain the disk 20 in contact with the hub 16.

Although the present invention is similar to that shown in U.S. Pat. No. 4,520,969, there are a number of significant differences. The tape spool of the prior invention did not includes a shoulder 32 and the splines were disposed horizontally on the flat upper surface 28 of the hub 16 and the lower surface of the web 38 of the disk 20. It was found that this prior construction was susceptible to rough handling in that radial forces on the disk 20 would cause the splines to lever the disk 20 axially away from the hub 16 and force the wear-button piece 22 out of its assembled position with respect to the hub 16. The relocation of the splines 34 and 36 greatly reduces this levering or wedging action of the splines in response to shock, although deflection of the splines 36 on the disk 20 still results in some wedging and axial movement of the disk 20 with respect to the hub 16. The addition of the shoulder 32, however, operates to prevent radial movement of the disk 20 with respect to the flange 16 after a very short distance and thus the wedging action of the splines 34 and 36 and the consequential axial movement of the disk 20 is arrested before the wear-button piece 22 is dislodged. Thus the spool 10 of the present invention retains the efficiency of assembly provided by the spool of U.S. Pat. No. 4,520,969, while avoiding the spontaneous disassembly problems caused by the prior construction.

I claim:

1. A tape spool for a tape cassette, which spool comprises a single piece including a flange and a hub having a cylindrical tape-winding surface and a radial wall defining a circular central opening concentric with said tape-winding surface, a disk which provides a second flange to complete said hub and thereby define said spool, and a separate piece bearing a wear button and including a collar having an inner face which bears against said disk and an outer face opposite said inner face, at least one detent projecting from said inner face of said collar and through said circular central opening of said hub to lock to said hub radial wall with said disk interposed between said collar and said hub to retain said disk adjacent said hub, and a protuberance on said outer face of said collar which defines said wear button, wherein the improvement comprises:

a first annular hub projection extending axially of said hub adjacent said separate piece to define a shoulder terminating closely adjacent said collar inner face;

a first inner radial wall in said disk which defines a central hole surrounding said hub projection, said hub projection and said inner radial wall of said disk interacting to restrict radial movement of said disk with respect to said hub;

a second annular hub projection having a diameter greater than that of said first annular projection and an outer surface parallel to the axis of said cylindrical tape winding surface to define a second shoulder, said second shoulder further including continuous splines extending parallel to said axis of said cylindrical tape winding surface; and a second inner radial wall in said disk oriented parallel to said axis of said tape winding surface and including splines intermeshing with said second shoulder splines to prevent rotation of said disk relative to said hub.

2. A tape spool according to claim 1 wherein the outer radial surface of said hub projection and said inner radial wall of said disk are parallel to each other and the axis of said hub tape-winding surface.

* * * * *